(12) United States Patent
Kora

(10) Patent No.: US 11,435,324 B2
(45) Date of Patent: Sep. 6, 2022

(54) SUPERCRITICAL FLUID APPARATUS

(71) Applicant: SHIMADZU CORPORATION, Kyoto (JP)

(72) Inventor: Chihiro Kora, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/643,795

(22) PCT Filed: Sep. 15, 2017

(86) PCT No.: PCT/JP2017/033496
§ 371 (c)(1),
(2) Date: Mar. 2, 2020

(87) PCT Pub. No.: WO2019/053887
PCT Pub. Date: Mar. 21, 2019

(65) Prior Publication Data
US 2020/0209199 A1    Jul. 2, 2020

(51) Int. Cl.
*G01N 30/02*  (2006.01)
*B01D 15/16*  (2006.01)
(Continued)

(52) U.S. Cl.
CPC ........... *G01N 30/02* (2013.01); *B01D 15/161* (2013.01); *B01D 15/40* (2013.01);
(Continued)

(58) Field of Classification Search
CPC ............. G01N 30/02; G01N 2030/027; G01N 2030/326; G01N 2030/328; G01N 2030/6013; B01D 15/40; B01D 15/161
See application file for complete search history.

(56) References Cited

U.S. PATENT DOCUMENTS 5,224,510 A * 7/1993 Pericles ............... F16K 31/004
137/341
8,965,187 B2 * 2/2015 Borgmeier ............. F16L 25/01
392/480
(Continued)

FOREIGN PATENT DOCUMENTS

EP    0 654 724 A1    5/1995
EP    0654724 A1 *    5/1995 ............... A23L 3/22
(Continued)

OTHER PUBLICATIONS

Machine translation of EP 0654724 A1, Jun. 30, 2021.*
(Continued)

*Primary Examiner* — Benjamin L Lebron
(74) *Attorney, Agent, or Firm* — Renner, Otto, Boisselle & Sklar, LLP

(57) ABSTRACT

Provided is a supercritical fluid apparatus including: an analysis flow path through which a mobile phase flows; a back-pressure control valve provided at a downstream end of the analysis flow path to adjust pressure in the analysis flow path to a predetermined pressure; a small-diameter pipe connected to the outlet of the back-pressure control valve, having an inner diameter allowing internal pressure to be maintained at a pressure higher than the atmospheric pressure; a large-diameter pipe connected to a downstream end of the small-diameter pipe, having a larger inner diameter than the small-diameter pipe; and a large-diameter pipe heating part for heating the large-diameter pipe.

6 Claims, 2 Drawing Sheets

(51) Int. Cl.
   *B01D 15/40* (2006.01)
   *G01N 30/32* (2006.01)
   *G01N 30/60* (2006.01)

(52) U.S. Cl.
   CPC . *G01N 2030/027* (2013.01); *G01N 2030/326* (2013.01); *G01N 2030/328* (2013.01); *G01N 2030/6013* (2013.01)

(56) References Cited

U.S. PATENT DOCUMENTS

| | | | |
|---|---|---|---|
| 2008/0010956 A1* | 1/2008 | Fogelman | B01D 11/0203 55/319 |
| 2013/0000144 A1 | 1/2013 | Choi et al. | |
| 2014/0217031 A1 | 8/2014 | Wang | |

FOREIGN PATENT DOCUMENTS

| | | |
|---|---|---|
| JP | 2013016797 A | 1/2013 |
| JP | 2014-517323 A | 7/2014 |
| JP | 3209072 U | 2/2017 |
| JP | 3211870 U | 8/2017 |
| NO | 2016/147379 A1 | 9/2016 |

OTHER PUBLICATIONS

International Search Report for corresponding Application No. PCT/JP2017/033496, dated Nov. 7, 2017.
Written Opinion for corresponding Application No. PCT/JP2017/033496, dated Nov. 7, 2017.
Office Action for corresponding JP Application No. 2019-541603 dated Dec. 1, 2020, with English language translation.
Office Action for corresponding CN Application No. 201780092957.5 dated May 7, 2022, with English language translation.

* cited by examiner

SUPERCRITICAL FLUID APPARATUS

TECHNICAL FIELD

The present invention relates to a supercritical fluid apparatus using a fluid in a supercritical state, such as a supercritical fluid chromatograph (SFC) or a supercritical fluid extraction (SFE).

BACKGROUND ART

Supercritical fluid apparatuses such as an SFC and an SFE raise pressure in a flow path through which a mobile phase containing liquid carbon dioxide flows to a predetermined pressure using a back-pressure control valve to put the carbon dioxide into a supercritical state (refer to Patent Document 1).

The supercritical fluid apparatuses are typically configured in such a way that a flow path downstream of the back-pressure control valve is open to the atmosphere solution. Thus, a mobile phase having passed through the back-pressure control valve rapidly decreases in pressure from a high-pressure state to an atmospheric-pressure state, so that the carbon dioxide is subjected to a phase change from a liquid state or a supercritical state to a gaseous state. At this time, an endothermic reaction occurs to cause decrease in temperature of an outlet portion of the back-pressure control valve, so that condensation may occur in a pipe on an outlet side of the back-pressure control valve. In some cases, the carbon dioxide instantaneously changes to dry ice to cause clogging in the flow path.

As a method for dealing with such a problem, the pipe on the outlet side of the back-pressure control valve is typically heated by a heater to suppress condensation or freezing due to heat of vaporization of the carbon dioxide.

PRIOR ART DOCUMENT

Patent Document

Patent Document 1: Japanese Patent Publication No. 2014-517323

SUMMARY OF THE INVENTION

Problems to be Solved by the Invention

As the amount of heat applied to the pipe on the outlet side of the back-pressure control valve increases, condensation and freezing downstream of the back-pressure control valve can be more efficiently suppressed. However, heating the outlet portion of the back-pressure control valve to a high temperature may adversely affect the back-pressure control valve. Thus, the entire pipe on the outlet side of the back-pressure control valve cannot be heated with a high amount of heat. In addition, a position where the carbon dioxide vaporizes cannot be accurately predicted. Thus, heating only a specific part of the pipe on the outlet side of the back-pressure control valve does not enable effective suppression of condensation and freezing due to heat of vaporization of the carbon dioxide.

Then, it is an object of the present invention to enable effective suppression of condensation and freezing in the pipe on the outlet side of the back-pressure control valve without adversely affecting the back-pressure control valve.

Solutions to the Problems

The present inventors have acquired knowledge that when an "abrupt expansion portion" abruptly expanded in inner diameter of a flow path is provided by connecting a small-diameter pipe having an inner diameter allowing internal pressure to be maintained at a pressure higher than the atmospheric pressure to an outlet of a back-pressure control valve while the small-diameter pipe is connected downstream to a large-diameter pipe with an inner diameter large than that of the small-diameter pipe, carbon dioxide vaporizes in the "abrupt expansion portion" or at a position downstream thereof when a mobile phase has a flow rate within a high flow rate range more than a predetermined flow rate range. In other words, providing the "abrupt expansion portion" as described above enables the position where carbon dioxide is vaporized to be disposed in a desired section, so that heating the section enables efficient suppression of condensation and freezing due to heat of vaporization of the carbon dioxide. The present invention is made based on the knowledge described above.

A supercritical fluid apparatus according to the present invention includes: an analysis flow path through which a mobile phase flows; a back-pressure control valve provided at a downstream end of the analysis flow path to regulate pressure in the analysis flow path to a predetermined pressure; a small-diameter pipe connected to the outlet of the back-pressure control valve, and having an inner diameter designed so that internal pressure of the small diameter pipe is maintained at a pressure higher than the atmospheric pressure; a large-diameter pipe connected to a downstream end of the small-diameter pipe, having an inner diameter larger than that of the small-diameter pipe; and a large-diameter pipe heating part for heating the large-diameter pipe. Accordingly, when the "abrupt expansion portion" abruptly expanded in inner diameter of a flow path is formed in a joint portion between the small-diameter pipe and the large-diameter pipe, and a mobile phase has a flow rate within a high flow rate range more than a predetermined flow rate range, a position where carbon dioxide vaporizes can be limited downstream of the "abrupt expansion portion", i.e., within the large-diameter pipe. Then, the large-diameter pipe heating part for heating the large-diameter pipe is provided. Thus, when the mobile phase has a flow rate within the high flow rate range, the section where carbon dioxide vaporizes can be reliably and efficiently heated. At least the small-diameter pipe exists between the large-diameter pipe and the back-pressure control valve, and the large-diameter pipe is not directly connected to the outlet of the back-pressure control valve. Thus, even when the large-diameter pipe heating part heats strongly to the large-diameter pipe, the back-pressure control valve may be less likely to be adversely affected.

Hereinafter, a flow rate range of the mobile phase where carbon dioxide vaporizes in the "abrupt expansion portion" in the joint portion between the small-diameter pipe and the large-diameter pipe downstream of the back-pressure control valve, or downstream of the "abrupt expansion portion", is referred to as a "high flow rate range", and a flow rate range of the mobile phase where carbon dioxide vaporizes upstream of the "abrupt expansion portion", i.e., in the small-diameter pipe, is referred to as a "low flow rate range". A flow rate in a boundary range whether the carbon dioxide vaporizes at a position downstream of the "abrupt expansion portion" or upstream thereof can vary in accordance with conditions, such as composition of the mobile phase, temperature of the mobile phase when flowing out from the back-pressure control valve, and a length or an inner diameter of the small-diameter pipe.

When the mobile phase has a flow rate within the low flow rate range, carbon dioxide vaporizes in the small-diameter pipe. This may cause condensation and freezing inside and outside the small-diameter pipe. Thus, the supercritical fluid apparatus according to the present invention preferably further includes a small-diameter pipe heating part configured to heat the small-diameter pipe. Incidentally, a heating amount required to prevent condensation and freezing due to vaporization of carbon dioxide varies in accordance with a flow rate range of the mobile phase. As the flow rate range of the mobile phase increases, the heating amount required to prevent condensation and freezing increases. When carbon dioxide vaporizes in the small-diameter pipe, the flow rate of the mobile phase has a flow rate within the low flow rate range, and thus, the heating amount may be smaller than that of the large-diameter pipe heating part. This does not cause a large amount of heat to be applied to a pipe near the back-pressure control valve, so that condensation and freezing due to vaporization of carbon dioxide in the small-diameter pipe can be suppressed without adversely affecting the back-pressure control valve.

As described above, when the mobile phase has a flow rate within the high flow rate range, carbon dioxide vaporizes downstream of the joint portion between the small-diameter pipe and the large-diameter pipe. Accordingly, the small-diameter pipe is not required to be heated by the small-diameter pipe heating part when the mobile phase has a flow rate within the high flow rate range. Thus, the supercritical fluid apparatus according to the present invention preferably includes a controller configured to control each heating amount of the large-diameter pipe heating part and the small-diameter pipe heating part, the controller causing the small-diameter pipe heating part to heat the small-diameter pipe when a mobile phase flowing through the analysis flow path has a flow rate equal to or lower than a predetermined flow rate, i.e., within the low flow rate range, and causing only the large-diameter pipe heating part to heat the large-diameter pipe when the mobile phase flowing through the analysis flow path has a flow rate more than the predetermined flow rate, i.e., within the high flow rate range. Accordingly, when the mobile phase has a flow rate within the high flow rate range, the small-diameter pipe with no vaporization of carbon dioxide is not heated unnecessarily, so that a place with vaporization of carbon dioxide can be efficiently heated in accordance with a flow rate range of the mobile phase.

In a flow rate range allowing carbon dioxide to vaporize in the small-diameter pipe, condensation and freezing due to heat of vaporization of the carbon dioxide can be suppressed by heating the small-diameter pipe using the small-diameter pipe heating part. On the other hand, in a flow rate range allowing carbon dioxide to vaporize in the large-diameter pipe, temperature of the large-diameter pipe rapidly decreases due to heat of vaporization of the carbon dioxide. Thus, monitoring the temperature of the large-diameter pipe enables determining whether the large-diameter pipe needs to be heated by the large-diameter pipe heating part.

Accordingly, the supercritical fluid apparatus of the present invention may further include a temperature sensor detecting temperature of the large-diameter pipe heating part, and a controller configured to control each heating amount of the large-diameter pipe heating part and the small-diameter pipe heating part, and the controller may be configured to cause only the small-diameter pipe heating part to be driven when temperature of the large-diameter pipe detected by the temperature sensor is equal to or higher than a predetermined temperature, and is configured to cause the large-diameter pipe heating part to be driven when the temperature of the large-diameter pipe is lower than the predetermined temperature. This enables the small-diameter pipe heating part and the large-diameter pipe heating part to be used properly as needed, so that a place where carbon dioxide vaporizes can be heated efficiently.

The large-diameter pipe heating part may include an electric circuit configured to cause an electric current to flow through the large-diameter pipe to cause the large-diameter pipe to generate heat. In a high flow rate range allowing carbon dioxide to vaporize in the large-diameter pipe, a large amount of heat is required to be applied to a fluid with high efficiency to suppress condensation and freezing due to heat of vaporization of the carbon dioxide. While a heater may be attached to an outer periphery of the large-diameter pipe to apply heat to a fluid flowing in the large-diameter pipe, it is more efficient to cause the large-diameter pipe itself to serve as a heater to generate heat that is directly transferred from the large-diameter pipe to the fluid.

The inner diameter of the small-diameter pipe may be substantially identical to an inner diameter of an outlet flow path provided in the back-pressure control valve. Accordingly, the abrupt expansion portion abruptly expanded in diameter of a flow path is not formed in an outlet portion of the back-pressure control valve, so that pressure in the small-diameter pipe is maintained at a level substantially identical to pressure in the outlet flow path of the back-pressure control valve. This suppresses vaporization of carbon dioxide near the outlet of the back-pressure control valve.

The inner diameter of the large-diameter pipe may be at least twice the inner diameter of the small-diameter pipe. This causes fluid pressure to decrease rapidly in the joint portion between the small-diameter pipe and the large-diameter pipe, so that vaporization of carbon dioxide is likely to be induced in the joint portion.

Effects of the Invention

The supercritical fluid apparatus according to the present invention is configured in such a way that the small-diameter pipe having an inner diameter at which the internal pressure is maintained at a pressure higher than the atmospheric pressure is connected to the outlet of the back-pressure control valve, and the small-diameter pipe is further connected at its downstream end to the large-diameter pipe having an inner diameter larger than that of the small-diameter pipe to form the abrupt expansion portion abruptly expanded in inner diameter of a flow path in the joint portion between the small-diameter pipe and the large-diameter pipe. Thus, when a mobile phase has a flow rate within the high flow rate range, a position where carbon dioxide vaporizes can be limited to the inside of the large-diameter pipe. Then, the large-diameter pipe heating part for heating the large-diameter pipe is provided. Thus, when the mobile phase has a flow rate within the high flow rate range, the section where carbon dioxide vaporizes can be reliably and efficiently heated.

EMBODIMENT OF THE INVENTION

Hereinafter, a supercritical fluid chromatograph as an example of a supercritical fluid apparatus according to the present invention will be described with reference to the drawings.

Figure 1:
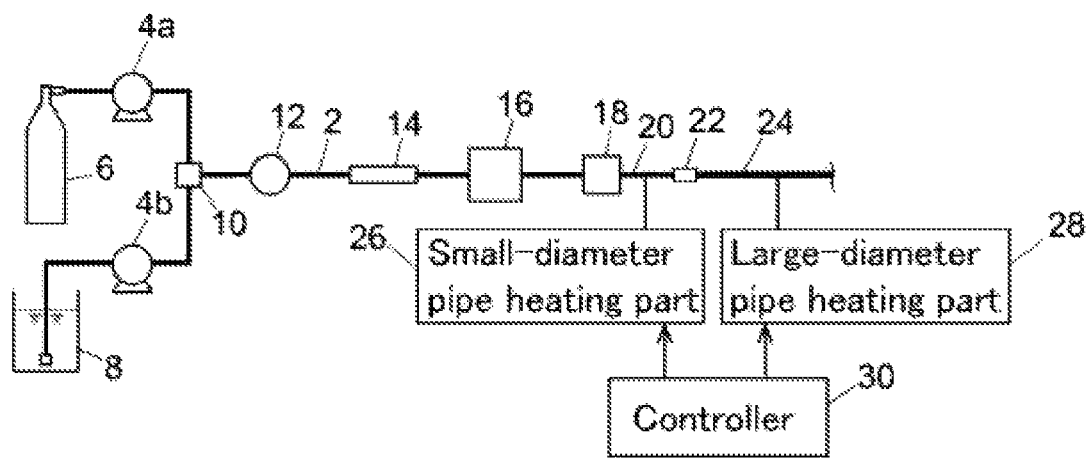
FIG. 1 is a block diagram schematically illustrating an example of a supercritical fluid apparatus.

As illustrated in FIG. 1, the supercritical fluid chromatograph of this example is configured in such a way that a liquid feed pump 4a feeds liquid carbon dioxide contained in a carbon dioxide cylinder 6 to a common mixer 10 and a liquid feed pump 4b feeds a modifier contained in a modifier container 8 thereto to form a mixed liquid that is then fed as a mobile phase into an analysis flow path 2. The analysis channel 2 is provided with a sample injection part 12, an analysis column 14, and a detector 16 from its upstream side, and a downstream end of the analysis channel 2 is connected to a back-pressure control valve 18.

The sample injection part 12 injects a sample to be analyzed into the analysis channel 2. The analysis column 14 is for separating the sample, which is injected into the analysis flow path 2 by the sample injection part 12, into individual components. The detector 16 detects the components separated in the analytical column 14.

The back-pressure control valve 18 is for regulating pressure in the analysis flow path 2 to a predetermined pressure. In the analysis flow path 2 controlled at the predetermined pressure by the back-pressure control valve 18, carbon dioxide in the mobile phase becomes a supercritical state and flows through the analysis column 14.

The back-pressure control valve 18 is connected at its outlet to a small-diameter pipe 20, and the small-diameter pipe 20 is connected at its downstream end to a large-diameter pipe 24 using a coupling 22. The small-diameter pipe 20 has an inner diameter that is substantially identical to that of an outlet flow path of the back-pressure control valve 18, and that is designed in a size allowing pressure in the small-diameter pipe 20 to be maintained at a pressure more than the atmospheric pressure. The large-diameter pipe 24 has an inner diameter that is more than the inner diameter of the small-diameter pipe 20, and that is preferably at least twice the inner diameter of the small-diameter pipe 20. The small-diameter pipe 20 has an inner diameter of, for example, about 0.5 mm, for example, and the large-diameter pipe 24 has an inner diameter of, for example, about 1.0 mm.

Although not illustrated, the large-diameter pipe 24 has a downstream end that is open to the atmosphere, and the inside of the large-diameter pipe 24 is at atmospheric pressure. On the other hand, the small-diameter pipe 20 has an inner diameter that is significantly smaller than that of the large-diameter pipe 24, and pressure in the small-diameter pipe 20 is maintained at a pressure higher than the atmospheric pressure. That is, there is an abrupt expansion portion abruptly expanded in flow path diameter in a joint portion between the small-diameter pipe 20 on an outlet side of the back-pressure control valve 18 and the large-diameter pipe 24, so that a fluid having flowed out of the back-pressure control valve 18 has a pressure that decreases rapidly when passing through the joint portion between the small-diameter pipe 20 and the large-diameter pipe 24.

This configuration induces vaporization of carbon dioxide in a section downstream of the joint portion between the small-diameter pipe 20 and the large-diameter pipe 24, i.e., in a certain section in the large-diameter pipe 24 when the mobile phase has a flow rate within the high flow rate range in which carbon dioxide does not vaporize in the small-diameter pipe 20. Thus, a large-diameter pipe heating part 28 that can heat a certain section of the large-diameter pipe 24 with a large amount of heat is provided.

On the other hand, when the mobile phase has a flow rate within the low flow rate range where carbon dioxide vaporizes in the small-diameter pipe 20, vaporization of the carbon dioxide in the small-diameter pipe 20 may cause condensation or freezing. Thus, to prevent condensation and freezing in the small-diameter pipe 20 as described above, also provided is a small-diameter pipe heating part 26 configured to heat the small-diameter pipe 20. The small-diameter pipe heating part 26 heats the small-diameter pipe 20 with the amount of heat that is smaller than that of the large-diameter pipe heating part 28 and that does not adversely affect the back-pressure control valve 18.

Driving of the small-diameter pipe heating part 26 and the large-diameter pipe heating part 28 is controlled by the controller 30. The controller 30 has a function obtained by executing a predetermined program using an arithmetic element such as a microcomputer provided in a dedicated computer or a general-purpose computer.

The controller 30 is configured to cause the large-diameter pipe heating part 28 to heat only the large-diameter pipe 24 when a flow rate range of the mobile phase is equal to or higher than a predetermined flow rate, and to cause the small-diameter pipe heating part 26 to heat the small-diameter pipe 20 when the flow rate range of the mobile phase is less than the predetermined flow rate.

A flow rate value as a threshold value for determining whether to drive the small-diameter pipe heating part 26 varies in accordance with composition of the mobile phase (a ratio of carbon dioxide in the mobile phase), pressure in the analysis flow path 2, and the like. Thus, the controller 30 preferably holds a data table indicating a relationship between the composition of the mobile phase and the like, and a flow rate value serving as a threshold value. In that case, the controller 30 is preferably configured to set a threshold value using the data table, and to determine whether to drive the small-diameter pipe heating part 26 in accordance with whether the flow rate of the mobile phase is equal to or higher than the threshold value. When gradient analysis for changing the composition of the mobile phase temporally is performed, the threshold value of a flow rate may be changed in accordance with the composition of the mobile phase changing temporally.

Figure 2:
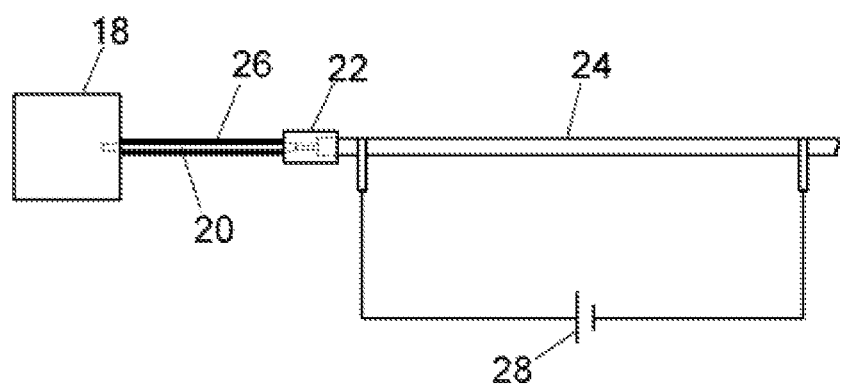
FIG. 2 is a diagram schematically illustrating a piping configuration on an outlet side of a back-pressure control valve of the example.

As illustrated in FIG. 2, a ribbon heater or the like directly attached to an outer peripheral surface of the small-diameter pipe 20 can be used as the small-diameter pipe heating part 26.

In addition, as illustrated in FIG. 2, the large-diameter pipe heating part 28 is preferably composed of an electric circuit that applies a voltage to a certain section of the large-diameter pipe 24 using a power source 28. When a voltage is applied to a certain section of the large-diameter pipe 24 by the voltage 28, an electric current flows through the large-diameter pipe 24, and the large-diameter pipe 24 generates heat due to resistance of the large-diameter pipe 24 itself. This enables a fluid flowing through the large-diameter pipe 24 to be efficiently heated by Joule heat generated in the large-diameter pipe 24. This configuration enables a large amount of heat to be applied to the fluid flowing through the large-diameter pipe 24, so that condensation and freezing due to heat of vaporization of carbon dioxide can be effectively suppressed even when the mobile phase has a flow rate within the high flow rate range.

In the above case, an insulating material is used as the coupling 22 to prevent the electric current in the large-diameter pipe 24 from flowing toward the back-pressure control valve 18. As a material for the coupling 22 described above, polyether ether ketone is available. In addition, any material that has a heat resistance of up to 120 degrees and is insulative is available for the material of the coupling 22. Examples of the material above include a thermoplastic resin.

Figure 3:
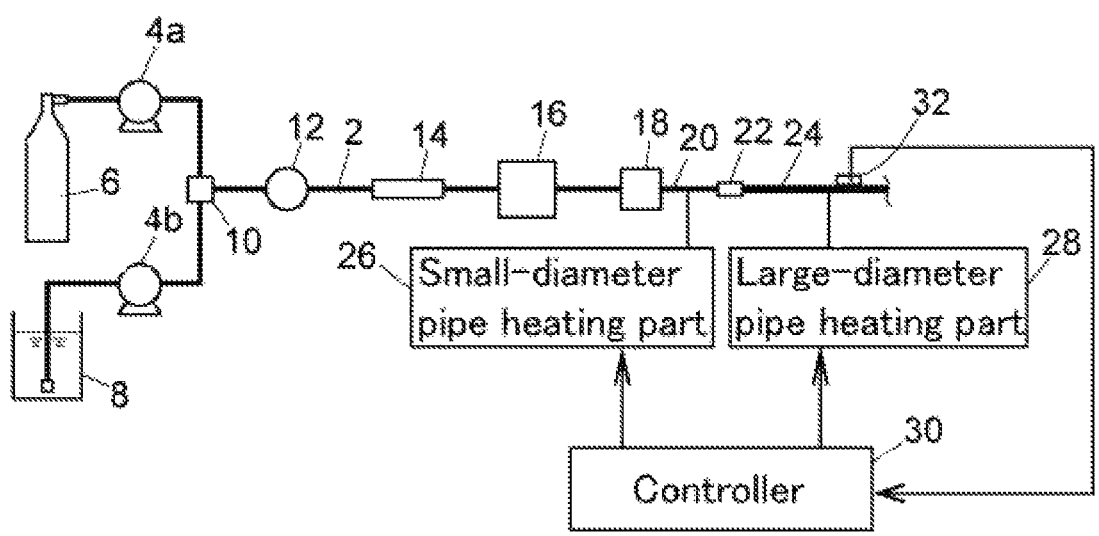
FIG. 3 is a block diagram schematically illustrating another example of the supercritical fluid apparatus.

As illustrated in FIG. 3, a temperature sensor 32 may be attached to the large-diameter pipe 24 so that the controller 30 drives the large-diameter pipe 24 based on temperature of the large-diameter pipe 24 detected by the temperature sensor 32. For example, the controller 30 may be configured to drive only the small-diameter pipe heating part 26 when the large-diameter pipe 24 has a temperature equal to or higher than a predetermined temperature, e.g., a room temperature or higher, and to drive the large-diameter pipe heating part 28 as well when the large-diameter pipe 24 has a temperature lower than the predetermined temperature.

In a flow rate range allowing carbon dioxide to vaporize in the small-diameter pipe 20, condensation and freezing due to heat of vaporization of carbon dioxide can be suppressed by heating the small-diameter pipe 20 using the small-diameter pipe heating part 26. On the other hand, in a flow rate range allowing carbon dioxide to vaporize in the large-diameter pipe 20, temperature of the large-diameter pipe 20 rapidly decreases due to heat of vaporization of the carbon dioxide. Thus, monitoring the temperature of the large-diameter pipe 24 enables determining whether the large-diameter pipe 24 needs to be heated by the large-diameter pipe heating part 28.

While in the above-described embodiment, an example is described in which any one of the small-diameter pipe heating part 26 and the large-diameter pipe heating part 28 is driven for heating, both the small-diameter pipe heating part 26 and the large-diameter pipe heating part 28 may be driven for heating.

DESCRIPTION OF REFERENCE SIGNS

2: Analysis flow path
4a, 4b: Liquid feed pump
6: Carbon dioxide cylinder
8: Modifier container
10: Mixer
12: Sample injection part
14: Analytical column
16: Detector
18: Back-pressure control valve
20: Small-diameter flow path
22: Coupling
24: Large-diameter flow path
26: Small-diameter pipe heating part
28: Large-diameter pipe heating part
30: Controller
32: Temperature sensor

The invention claimed is:

1. A supercritical fluid apparatus comprising:
an analysis flow path through which a mobile phase flows;
a back-pressure control valve provided at a downstream end of the analysis flow path to regulate pressure in the analysis flow path to a predetermined pressure;
a small-diameter pipe connected to the outlet of the back-pressure control valve, and having an inner diameter designed so that internal pressure of the small-diameter pipe is maintained at a pressure higher than the atmospheric pressure;
a large-diameter pipe connected to a downstream end of the small-diameter pipe, having an inner diameter larger than that of the small-diameter pipe;
a coupling provided between the small-diameter pipe and the large-diameter pipe to connect the small-diameter pipe and the large-diameter pipe;
a large-diameter pipe heating part arranged only on the large-diameter pipe; and
a small-diameter pipe heating part arranged only on the small-diameter pipe and configured to heat the small-diameter pipe with a heating amount smaller than that of the larger-diameter heating part.

2. The supercritical fluid apparatus according to claim 1, wherein the large-diameter pipe heating part includes an electric circuit configured to cause an electric current to flow through the large-diameter pipe to cause the large-diameter pipe to generate heat.

3. The supercritical fluid apparatus according to claim 1, wherein the inner diameter of the small-diameter pipe is substantially identical to an inner diameter of an outlet flow path provided in the back-pressure control valve.

4. The supercritical fluid apparatus according to claim 1, wherein the inner diameter of the large-diameter pipe is at least twice the inner diameter of the small-diameter pipe.

5. A supercritical fluid apparatus comprising:
an analysis flow path through which a mobile phase flows;
a back-pressure control valve provided at a downstream end of the analysis flow path to regulate pressure in the analysis flow path to a predetermined pressure;
a small-diameter pipe connected to the outlet of the back-pressure control valve, and having an inner diameter designed so that internal pressure of the small-diameter pipe is maintained at a pressure higher than the atmospheric pressure;
a large-diameter pipe connected to a downstream end of the small-diameter pipe, having an inner diameter larger than that of the small-diameter pipe;
a large-diameter pipe heating part for heating the large-diameter pipe;
a small-diameter pipe heating part configured to heat the small-diameter pipe with a heating amount smaller than that of the large-diameter pipe heating part; and
a controller configured to control each heating amount of the large-diameter pipe heating part and the small-diameter pipe heating part,
wherein the controller is configured to cause the small-diameter pipe heating part to heat the small-diameter pipe when a mobile phase flowing through the analysis flow path has a flow rate equal to or lower than a predetermined flow rate, and is configured to cause only the large-diameter pipe heating part to heat the large-diameter pipe when the mobile phase flowing through the analysis flow path has a flow rate more than the predetermined flow rate.

6. A supercritical fluid apparatus comprising:
an analysis flow path through which a mobile phase flows;
a back-pressure control valve provided at a downstream end of the analysis flow path to regulate pressure in the analysis flow path to a predetermined pressure;
a small-diameter pipe connected to the outlet of the back-pressure control valve, and having an inner diameter designed so that internal pressure of the small-diameter pipe is maintained at a pressure higher than the atmospheric pressure;
a large-diameter pipe connected to a downstream end of the small-diameter pipe, having an inner diameter larger than that of the small-diameter pipe;

a large-diameter pipe heating part for heating the large-diameter pipe;
a small-diameter pipe heating part configured to heat the small-diameter pipe with a heating amount smaller than that of the large-diameter pipe heating part;
a temperature sensor detecting temperature of the large-diameter pipe heating part; and
a controller configured to control each heating amount of the large-diameter pipe heating part and the small-diameter pipe heating part,
wherein the controller is configured to cause only the small-diameter pipe heating part to be driven when temperature of the large-diameter pipe detected by the temperature sensor is equal to or higher than a predetermined temperature, and is configured to cause the large-diameter pipe heating part to be driven when the temperature of the large-diameter pipe is lower than the predetermined temperature.

* * * * *